United States Patent

[11] 3,582,089

| [72] | Inventor | Franklyn J. Amorese<br>Hilton, N.Y. |
|---|---|---|
| [21] | Appl. No. | 815,606 |
| [22] | Filed | Apr. 14, 1969 |
| [45] | Patented | June 1, 1971 |
| [73] | Assignee | Sybron Corporation<br>Rochester, N.Y. |

[54] PACKAGE ROTATING SHAFT SEAL ASSEMBLY
6 Claims, 2 Drawing Figs.

[52] U.S. Cl. ............................................... 277/38,
277/61, 277/74, 277/65
[51] Int. Cl. .................................................. F16j 9/00,
F16j 15/00
[50] Field of Search ........................................ 277/35, 38,
39, 40, 61, 74, 59, 65

[56] References Cited
UNITED STATES PATENTS

| 2,445,018 | 7/1948 | Brady, Jr. ........................ | 277/40 |
| 2,555,492 | 6/1951 | Kidney ........................... | 277/74X |
| 2,723,868 | 11/1955 | Hartranft ........................ | 277/61 |
| 3,006,667 | 10/1961 | Stephens ....................... | 277/61X |
| 3,031,197 | 4/1962 | Wilkinson ...................... | 277/74X |
| 3,333,856 | 8/1967 | Voitik ............................ | 277/59 |

*Primary Examiner*—Samuel B. Rothberg
*Attorney*—Theodore B. Roessel

ABSTRACT: A rotating compact package seal assembly is disclosed, the seal being designed as a double mechanical seal with one seal mounted concentrically inside the other seal. The compact seal of the invention is thereby approximately one-half the package height of a conventional double mechanical seal and contains means whereby the inner and outer seals may be connected together for easy removal of the seal assembly as a unit thereby providing a seal assembly that may be bench assembled, tested, and stocked on the customer's shelf as a pretested assembly which may be later installed with a minimum of downtime.

INVENTOR
FRANKLYN J. AMORESE

BY Theodore B Roessel

ATTORNEY

PACKAGE ROTATING SHAFT SEAL ASSEMBLY

BACKGROUND OF THE INVENTION

This invention relates generally to sealing devices and more particularly to a compact package seal assembly designed for application to rotating shafts.

In the sealing of rotating shafts, such as a mixer agitator shaft, it is often desirable to accomplish the sealing by the use of double mechanical seals, having one seal mounted on top of the other to achieve the necessary sealing action. Prior art seals of this type are typified in the U.S. Pat. to E. S. Harrison, No. 2,931,631, and comprise an upper seal in juxtaposition to a lower seal with means for pressurizing the annular space between said seals at a pressure substantially above the pressure in the vessel to be sealed.

In the prior art seals of this type, the mixer output shaft bearing is generally mounted directly above the seal assembly, as close to the assembly as possible. This is done in order to ensure shaft rigidity which is an important factor in prolonging seal life and maintaining seal performance since the more rigid the shaft is in the seal area, the better the performance and the overall seal life. The design of the prior art double mechanical seal that is one above another, however, necessitates that the seal housing be relatively high which in turn results in the shaft bearings being located at some distance from the lower seal face. The distance of the shaft bearing from the shaft seal detracts from the rigidity of the shaft in the seal area and has an adverse effect on the useful life of the seal.

Another disadvantage of this prior art construction is that since the seals must be removed one by one, there is considerable downtime involved in removing the seals for repair or replacement. Since each seal is a separate unit, it is also difficult to preassemble both seals together for shop testing so that the integrity of the seal can be ascertained only after the seal is in place.

SUMMARY OF THE INVENTION

The present invention overcomes the difficulties and limitations found in prior art double mechanical seal assemblies and provides a compact package seal assembly which comprises a plurality of sealing means mounted concentrically one inside the other to thereby provide a packaged seal having a height of approximately one-half that of the beforementioned prior art seals. As a result, the seal assembly of the invention permits a closer location of the mixer shaft bearings thereby ensuring better rigidity of the shaft in the seal area with a corresponding increase in seal performance and seal life.

The compact seal assembly of the invention also contains means for connecting the inner and outer sealing means together so that the seal assembly, that is both seals, may be removed as a unit from the shaft thereby requiring a minimum of downtime. Because the compact seal assembly of the invention may be preassembled by the manufacturer, it can be tested and stocked on the shelves of the customer as a pretested assembly ready for quick installation upon a breakdown of the seal assembly in service.

Accordingly, it is an object of the invention to provide a new and novel rotating shaft seal assembly which is compact in construction and is approximately one-half the package height of conventional seal assemblies.

Another object of the invention is to provide a new and novel compact package seal assembly that may be removed from the shaft on which it is mounted as a unit for bench testing and necessary repair.

Still another object of the invention is to provide a new and novel compact package seal assembly having a plurality of sealing means contained therein, said sealing means having longer seal life and better seal performance resulting from a more rigid shaft in the seal area.

These and other objects and advantages of the invention will become apparent from a study of the attached drawings and from a reading of the description of the preferred embodiment.

DESCRIPTION OF THE PREFERRED EMBODIMENTS

Figure 1:
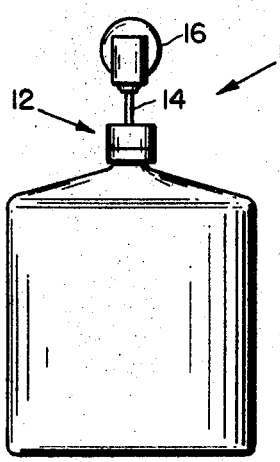
FIG. 1 is a general elevation view of a mixer with the compact package seal assembly of the invention mounted on the mixer agitator shaft.

Referring more particularly to the drawings, there is shown in FIG. 1 a general elevation view of a mixer 10 having the compact package seal assembly generally indicated at 12 mounted on a mixer agitator shaft 14 which is driven by a motor 16 by a means well known in the art.

Figure 2:
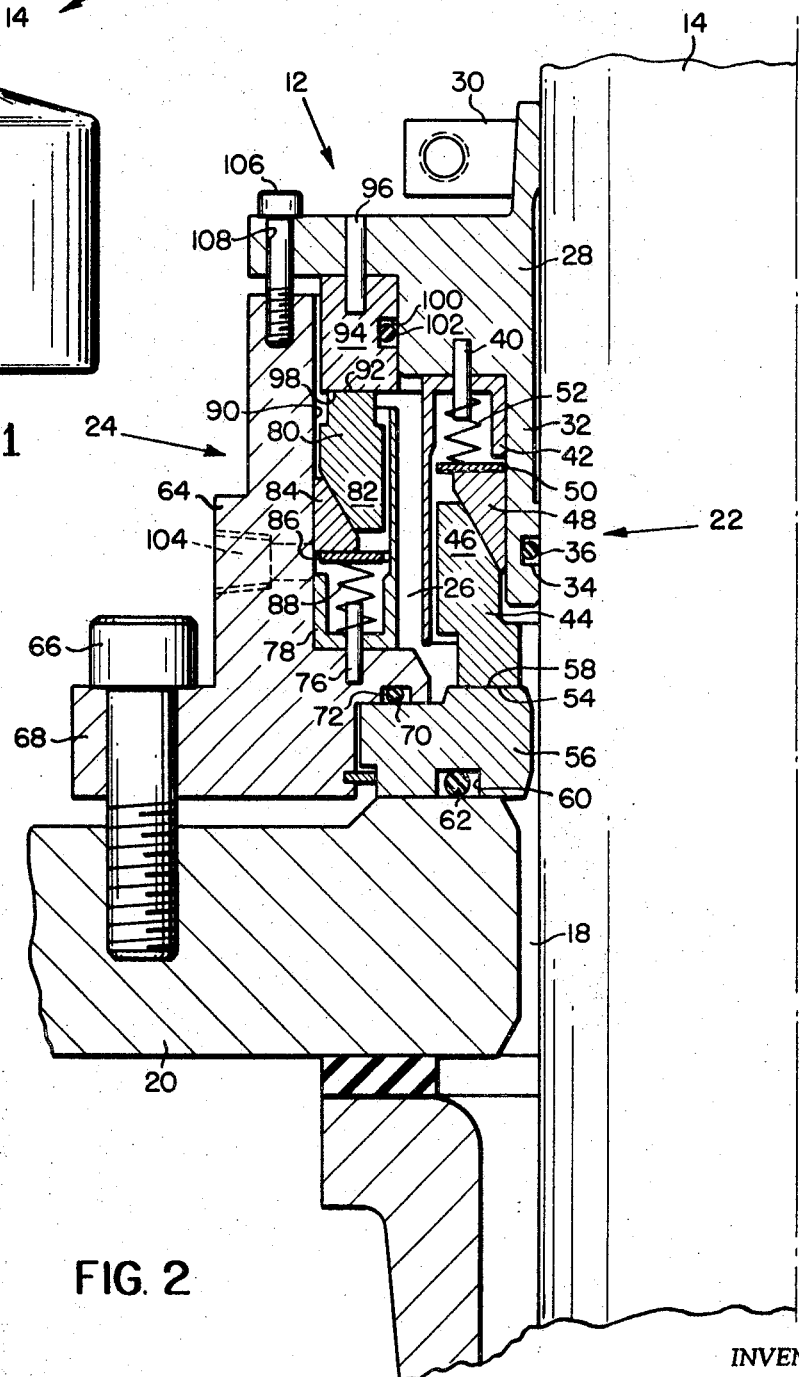
FIG. 2 is an enlarged half section of the compact packaged seal assembly, symmetrical about the center line of the agitator shaft, and showing the respective parts of the invention positioned on the agitator shaft.

Turning now to FIG. 2 of the drawing, there is shown an enlarged half section of the compact seal assembly generally indicated at 12 mounted on shaft 14 and to the vessel, the shaft extending through a passage 18 in the top wall 20 of the vessel. The seal assembly 12 of the invention comprises an inner seal generally indicated at 22 mounted concentrically within an outer seal generally indicated at 24, the inner and outer seals together defining a generally annular space 26 therebetween. The inner seal comprises a retainer 28 which is rigidly fixed to shaft 14 by means of a clamp 30, the retainer being provided with a downwardly extending sleeve portion 32 which has an annular groove 34 therein for receiving an O-ring 36 for sealing against the shaft. Attached to the retainer about sleeve 32 by means of a pin 40 is a spring cage 42 which contains the means for urging the sealing means of the inner seal into fluid-tight rotating engagement with its stationary seal seat.

The sealing means of inner seal 22 comprises an annular rotating seal member 44 having a tapered end 46 for engagement with a wedge 48. Wedge 48 is held in place against a ring 50 which in turn is engaged by a compression spring 52, the spring serving to constantly and resiliently urge wedge 48 toward the tapered end of seal member 44 and against sleeve 32 thereby holding the wedge in sealing position against the sleeve for purposes set out hereinbelow. The other end of seal member 44 is provided with a rotating sealing surface 54.

Completing inner seal 18 is a stationary seal seat 56 provided at one end with a sealing surface 58 and at another end with an annular groove 60 which receives an O-ring 62 to seal the stationary seat against the top 20 of the vessel about passage 18. The seal assembly thus described serves as a rotating inner seal 22.

Concentrically located about the rotating inner seal assembly is outer seal assembly 24 which is similar in configuration to the inner seal. Outer seal assembly 24 comprises a housing 64 which surrounds inner seal assembly 22 and is radially spaced therefrom. The housing is attached to top 20 of the vessel and sealed against stationary seal seat by a plurality of capscrews 66 extending through a peripheral flange 68 provided on the lower portion of the housing. The seal between housing 64 and stationary seal seat 56 is provided by an O-ring 70 contained in a groove 72.

Attached within the housing by means of a pin 76 is a spring cage 78 which contains a means for urging the sealing means of the outer seal into fluid-type contact with its rotating seal seat. The sealing means of the outer seal comprises an annular sealing member 80 which has a tapered end 82 for engagement with a wedge 84. Wedge 84 is held in place against a plate 86 which in turn is engaged by a compression spring 88 serving to constantly and resiliently urge wedge 84 into firm engagement with the tapered end of seal member 80 thereby holding the wedge in sealing position against the inner peripheral wall surface 90 of housing 64 for purposes set out hereinbelow. The other end of seal member 80 carries a stationary sealing surface 92.

Completing outer seal 24 is a rotating seal member 94 which is rigidly attached to retainer 28 by means of a pin 96. Sealing member 94 is provided with a sealing surface 98 and with an annular groove 100 which contains an O-ring 102 for sealing against the retaining ring 28.

Extending through housing 64 as shown by the dashed lines in FIG. 2 is a passage 104 which serves as a means for introducing the fluid under pressure into annular space 26. Accordingly, with O-rings 70 and 102 and sealing engagement with their respective sealing surfaces, with wedge 48 sealing against the sleeve portion 32 of retainer 28 and wedge 84 sealing against housing 64 and with rotating sealing surfaces 54 and 98 in fluidtight rotary sealing engagement with stationary seal seats 58 and 92, it will be appreciated that annular space 26 becomes a fluidtight compartment for supplying fluid to the rotating seal faces at all times during operation of the seal assembly.

It can readily be seen that by use of the concentrically mounted double mechanical seal provided by the inner and outer seal assembly 22 and 24 respectively, here is provided a double-seal assembly of approximately one-half the package height of prior art conventional double-seal assemblies. This reduction in height permits the location of a shaft bearing closer to the sealing area thereby improving both shaft rigidity and the service life of the seal as mentioned hereinabove. When it is necessary to repair or replace the package seal assembly 12, means are provided for connecting inner seal 22 and outer seal 24 together to aid in removal of both seals as a unit. This is accomplished by using a plurality of screws 106 which can be inserted through openings 108 located about the periphery of retaining ring 28 and threaded into housing 64 to rigidly fasten the retainer to the housing when removal of the entire unit is desired.

Moreover, the inner and outer seals can be preassembled by means of screws 106 and the assembly bench tested to ensure a fluidtight seat between the seal faces 54, 58 and 92, 98 by introducing fluid under pressure through passage 104 and into chamber 26. Any failure of the seal can be detected by seepage at the seal faces. After testing, the seal assembly can be stored in its assembled condition as an on-shelf-replacement item wherein after attachment to a vessel about a rotatable shaft, screws 106 are removed for operation of the rotary seal.

Having thus described the invention, what I claim as new is:

1. A package rotary seal assembly for rotatably sealing a shaft extending through a passage in a vessel wall said seal assembly comprising:
   a. an outer rotating seal surrounding said shaft including a pair of members, one member of said pair being a rotating member and another being a stationary member;
   b. an inner rotating seal surrounding said shaft and mounted concentrically within said outer rotating seal, said inner rotating seal including a pair of members, one member of said pair being a rotating member and another member being a stationary member;
   c. a retainer fixed to and sealed about the periphery of said shaft and extending radially outward therefrom;
   d. means carried by said retainer for supporting each of said rotating members one of said rotating members being rigidly attached and axially fixed to said retainer and another of said rotating members being axially movable with respect to said retainer;
   e. means for attaching said stationary members to said vessel about said passage;
   f. said rotating and stationary members each having a sealing surface thereon with one member of each pair being axially movable toward another to abut said sealing surfaces; and
   g. means carried by said inner and outer concentric rotating seals for urging said rotating and stationary members of each pair together to seat said sealing surfaces thereon one against another in a fluidtight rotary engagement.

2. A seal assembly as set forth in claim 1 further comprising means for rigidly connecting said rotating and stationary members of each pair together to facilitate removal of said inner and outer concentric rotating seals from about said shaft as a unit.

3. A rotating shaft seal assembly for use in providing a fluidtight seal between a vessel wall and a shaft passing through an opening in said wall, said rotating shaft seal assembly comprising:
   a. a retainer including means for fixing and sealing said retainer about said shaft for rotation with said shaft;
   b. a housing including means for fixing and sealing said housing to said vessel about said opening;
   c. first rotating seal means for disposition about said shaft having a rotating annular member carried by said retainer and a stationary annular member carried by said housing said rotating and stationary annular members each having a sealing surface;
   d. second rotating seal means mounted concentrically within said first rotating seal means having a rotating annular member carried by said retainer and a stationary annular member carried by said housing said rotating and stationary annular members each having a sealing surface;
   e. a cage fixed to said housing for slidably receiving said stationary member of said first rotating seal means;
   f. bias means in said cage for urging said stationary annular member of said first rotating seal means axially against said rotating annular member of said first rotating seal means; and
   g. means carried by said second rotating seal means for urging said rotating and stationary members thereof into fluidtight rotary sealing engagement.

4. A rotating shaft seal as set forth in claim 3 including means for rigidly connecting said retainer and housing together.

5. A rotating shaft seal assembly for use in providing a fluidtight seal between a vessel wall and a shaft passing through an opening in said wall, said rotating shaft seal assembly comprising:
   a. a retainer including means for fixing and sealing said retainer about said shaft for rotation therewith;
   b. a housing including means for fixing and sealing said housing to said vessel about said opening;
   c. first rotating seal means for disposition about said shaft having a rotating member carried by said retainer and a stationary member carried by said housing said rotating and stationary members each having a sealing surface thereon;
   d. second rotating seal means mounted concentrically within said first rotating seal means having a rotating member carried by said retainer and a stationary member carried by said housing said rotating and stationary members each having a sealing surface thereon;
   e. said stationary members being mounted concentrically on said housing and about said shaft one within another with the sealing surfaces of both of said stationary members facing in the same axial direction;
   f. said rotating members being mounted concentrically on said retainer and about said shaft one within another with the sealing surfaces of both of said rotating members facing in the same direction axially opposed to the sealing surfaces of said stationary members; and
   g. means carried by said first and second rotating seal means for urging said rotating and stationary members of each of said seal means into fluidtight rotary sealing engagement.

6. A rotating shaft seal assembly as set forth in claim 5 wherein the rotating member of one of said rotating seal means axially overlaps at least in part the stationary member of another of said rotating seal means.